US005942076A

United States Patent [19]

Salerno et al.

[11] Patent Number: 5,942,076

[45] Date of Patent: Aug. 24, 1999

[54] INFLATABLE CUSHION FORMING MACHINE

[75] Inventors: Mark Salerno, Monroe, Conn.; James Corliss, Spofford, N.H.; George Bertram, Newtown, Conn.

[73] Assignee: Sealed Air Corporation, Saddle Brook, N.J.

[21] Appl. No.: 08/816,272

[22] Filed: Mar. 13, 1997

[51] Int. Cl.$^{6}$ .......................... B29C 65/22; B32B 31/12; B32B 31/18; B32B 31/20

[52] U.S. Cl. .......................... 156/359; 156/147; 156/495; 156/497; 156/513; 156/583.1

[58] Field of Search .................................... 156/359, 495, 156/497, 513, 583.1, 145, 147

[56] References Cited

U.S. PATENT DOCUMENTS

| | | | |
|---|---|---|---|
| 3,703,430 | 11/1972 | Rich | 156/497 |
| 3,936,008 | 2/1976 | Crum . | |
| 3,938,298 | 2/1976 | Luhman et al. | 156/147 |
| 4,017,351 | 4/1977 | Larson et al. | 156/497 |
| 4,377,738 | 3/1983 | Berg | 156/583.9 |
| 5,112,289 | 5/1992 | Kohn | 493/194 |
| 5,340,632 | 8/1994 | Chappurs | 156/497 |
| 5,374,008 | 12/1994 | Halvorson et al. . | |
| 5,552,003 | 9/1996 | Hoover et al. | 156/147 |
| 5,597,499 | 1/1997 | Dunn . | |

FOREIGN PATENT DOCUMENTS

| | | |
|---|---|---|
| 0 425895A1 | 5/1991 | European Pat. Off. . |
| WO91/12175 | 8/1991 | WIPO . |
| WO94/07678 | 4/1994 | WIPO . |

OTHER PUBLICATIONS

PCT/US98/05280 International Search Report mailed Jul. 3, 1998.

*Primary Examiner*—Steven D. Maki
*Attorney, Agent, or Firm*—Alston & Bird LLP

[57] ABSTRACT

There is provided an inflatable cushion filling machine for forming inflated packaging cushions from a roll of tubular thermoplastic material. The machine includes a film supply section and a cushion forming section. The cushion forming section includes means for delivering the tubular material through the cushion forming section; means for applying tension to the web of tubular material while air is being introduced into the tubular material. Means are provided for introducing air into the area between the tension means to fill the cushion. When filled, a sealing band, displaced transversely across the inflated tubular thermoplastic material, seals the lower end to form the top of one cushion and the bottom of the next cushion. Prior to forming the cushion, the walls of the tubular material separate from each other by the residual air from the filling operation of the previous cushion. A perforation knife may be provided to separate each cushion from the next succeeding cushion.

11 Claims, 4 Drawing Sheets

INFLATABLE CUSHION FORMING MACHINE

BACKGROUND OF THE INVENTION

The present invention relates to a device for making inflatable packaging material. More particularly, the present invention relates to a device for making cellular inflatable packaging cushions from tubular thermoplastic material.

When articles are packaged in a container or box for shipping, there are frequently void spaces in the container. Protective packaging material for articles of different sizes and shapes is commonly used to cushion articles during shipping. There are numerous types and forms of packaging material for this purpose including waste paper, embossed paper, laminated bubble paper and plastic beads, known as peanuts. These forms of packaging material do not always provide the cushioning and void fill needed when shipping.

Inflatable cushion packaging material has found widespread use in the packaging industry. Various forms of inflatable cushions have been proposed for use in protecting articles during shipment. One type of inflatable cushion is a multiple use inflatable cushion which is placed around the article to be protected and inflated after the cushion is placed in the shipping container.

Certain advantages, such as ease of use, may be had by using simple, one-use rectangular cellular sealed cushions. Examples of such cellular cushioning materials are shown in U.S. Pat. Nos. 3,817,803 and 5,340,632. The ability to make these types of cushions simply, efficiently and at the point of use is of paramount importance. One example of such a device is disclosed in European Patent 0 513 235 B1 to Plateau which describes a machine for making inflatable cushions which includes welding sheets of material together, introducing air to the tubular material and sealing the ends.

SUMMARY OF THE INVENTION

Therefore, it is an object of the present invention to provide a device for making inflatable, one-use packaging material.

It has been found that the foregoing object may be accomplished in accordance with this invention by providing an inflatable cushion filling machine for forming inflated packaging cushions from a roll of tubular thermoplastic material. The machine includes a film supply section and a cushion forming section. The film supply section includes a pair of arms having channels or slots for holding a roll of tubular thermoplastic material. In a preferred embodiment, one of the arms has a brake which maintains constant web tension on the roll of tubular material.

The cushion forming section includes a first pair of rolls which are a drive roll and a nip roll forming a nip therebetween through which the tubular material passes and a second pair of rolls comprising a drive roll and associated nip roll forming a nip therebetween through which the tubular material passes. The first drive roll is reversible to apply tension to the web of thermoplastic material while air passes into the tube to form a pre-bubble and separate the sides of the tubular material.

While under tension, the upper end and the lower end of the tube are in an airtight relationship between the pairs of rolls. Means, such as a plurality of needles, are provided for introducing air into the tubular material between pairs of rolls. Means are provided for retracting the second nip roll toward and away from the second drive roll allowing the tubular material containing a pre-bubble of air to pass. After the tubular material is filled with air, a means, such as a heat seal band or wire, displaced transversely across the thermoplastic material, seals the lower end of the cushion above and below the area of the holes made during filling to form the bottom of the cushion. As mentioned, prior to filling the cushion with air, the walls of the tubular thermoplastic material separate from each other by the residual air from the filling operation of the previous cushion. A perforation knife may be provided to separate each cushion from the next succeeding cushion.

BRIEF DESCRIPTION OF THE DRAWINGS

Other objects, features and advantages of the invention will become apparent from the following detailed description of the invention when taken in conjunction with the accompanying drawings, in which.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
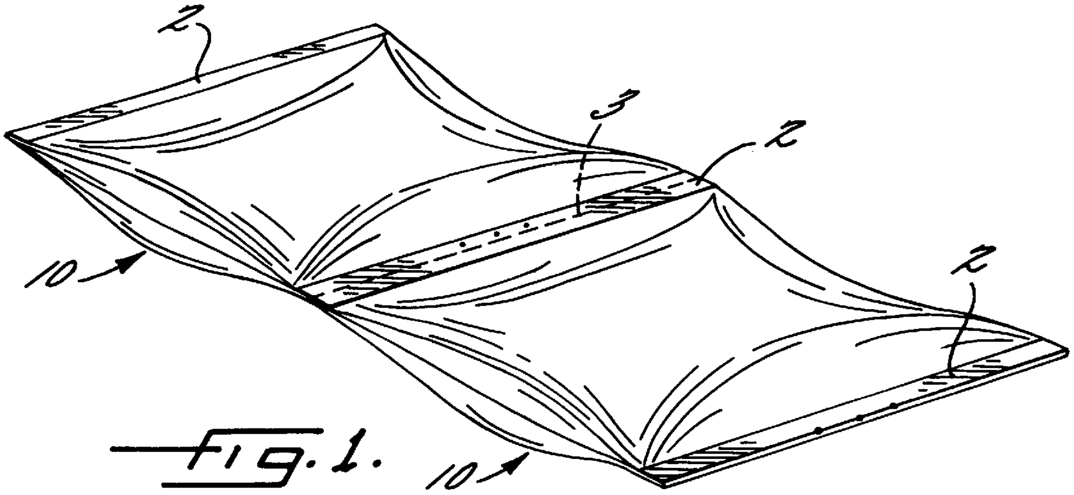
FIG. 1 is an isometric view of a pair of packaging cushions attached to each other made by the cushion filling machine of the present invention.

Referring now to the drawings and in particular FIG. 1, there is shown a pair of inflated packaging cushions 10 of the present invention formed from a tube of air impermeable thermoplastic material. Each cushion is formed along weld lines 2 and inflated as will be described hereafter. The cushions are formed in a series attached to each other and may be separated along perforated line 3. Depending upon the cushioning protection desired, the width and length of the cushions may vary but are generally in the range of 3" by 3" to 12" by 12" or larger.

Figure 3:
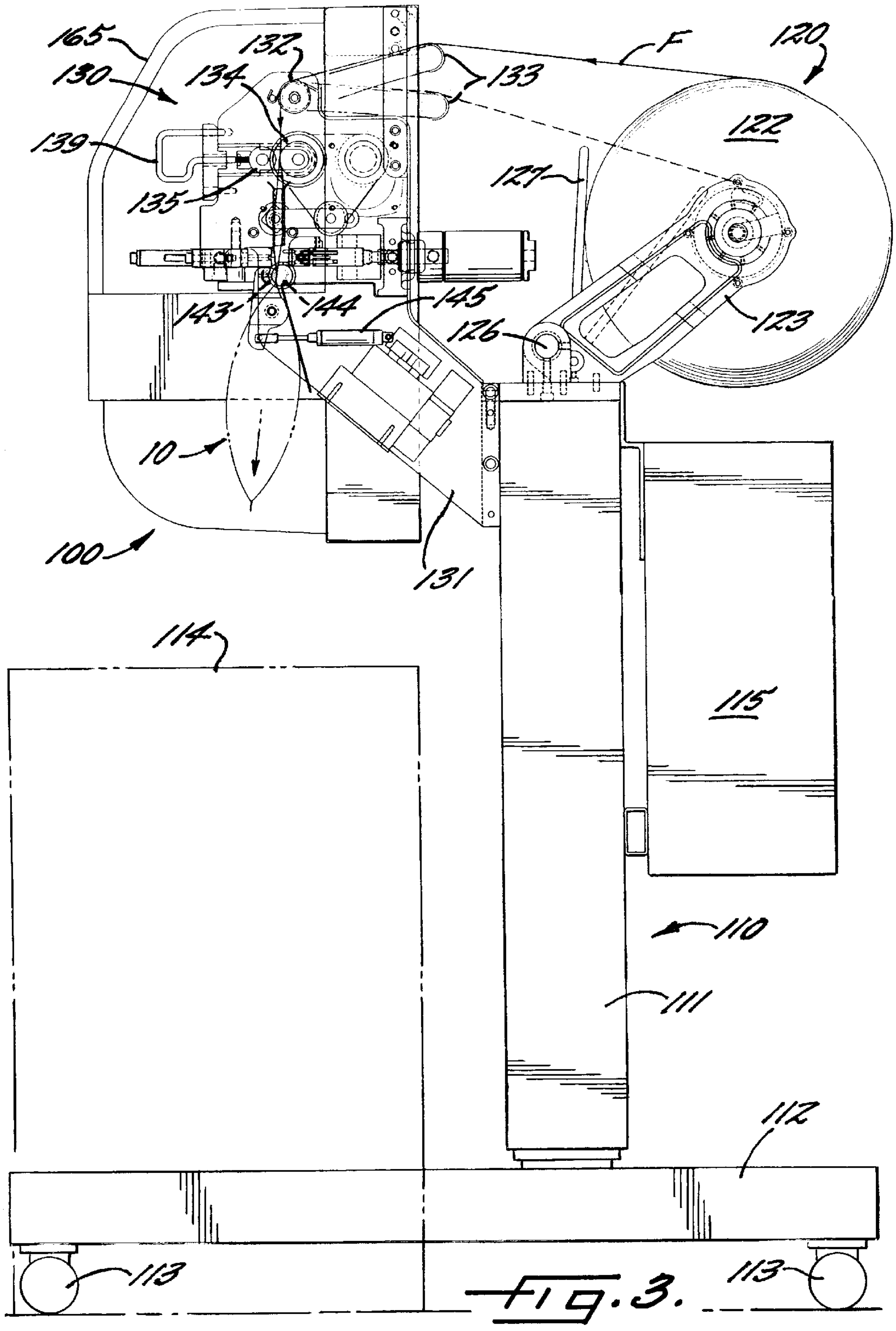
FIG. 3 is a side view of the cushion filling machine of the present invention.
Figure 4:
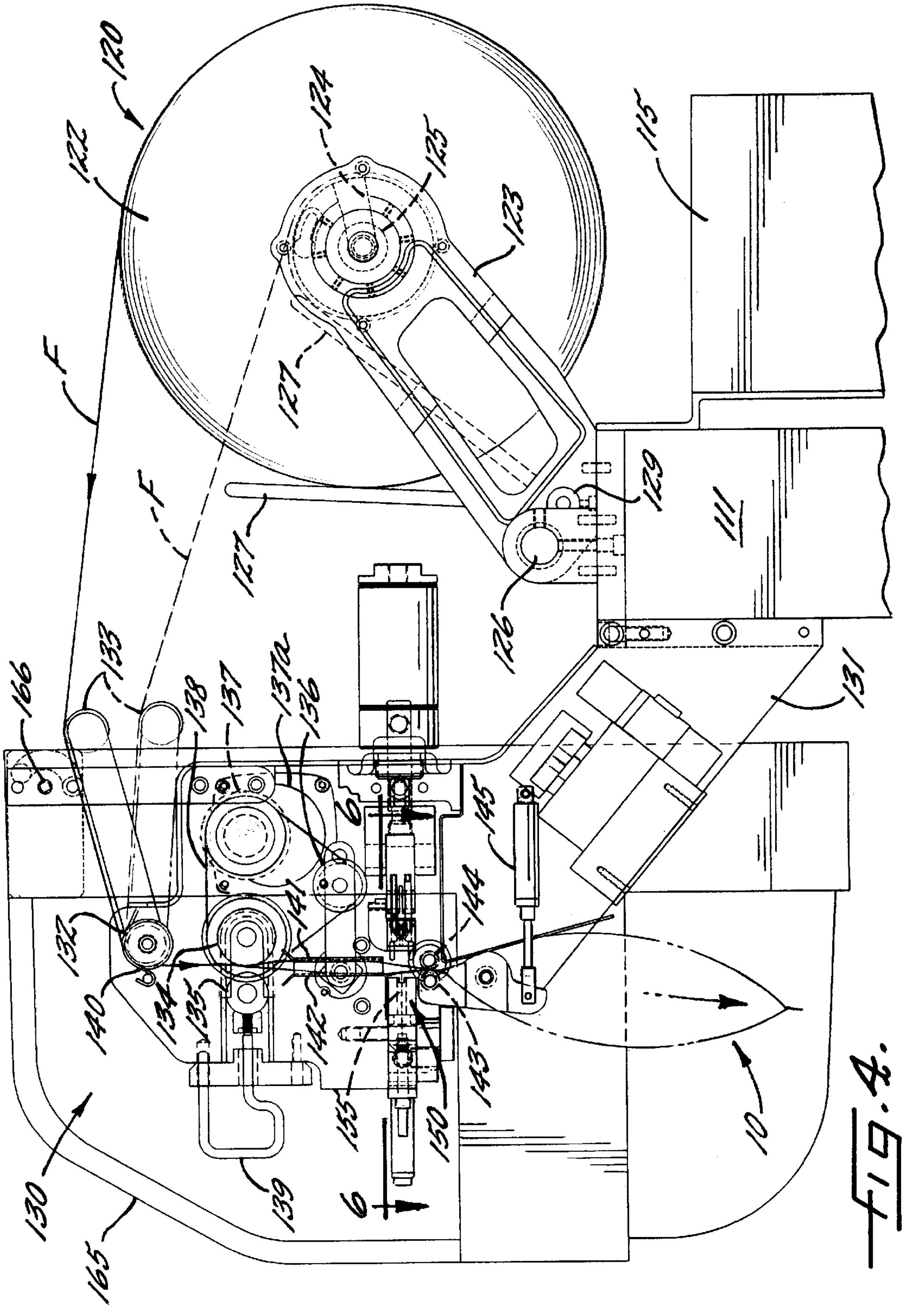
FIG. 4 is an exploded side view of the cushion filling section of the machine of the present invention.

As shown in FIGS. 3 and 4, the inflatable cushion forming machine 100 includes a support 110, a film supply section 120, and a cushion forming section 130. The support 110 has a telescoping column 111 mounted to a moveable platform 112 having rollers 113. The telescoping column 111 is adjustable upward and downward over a range of, for example, about 24 inches. The height of the column will depend upon the height of the product conveyor 114. The moveable platform 112 is positioned adjacent the product conveyor 114 so that the cushion forming section 130 is over the conveyor. As a container, such as a corrugated box, holding an article to be protected, passes the cushion forming section 130, the operator starts the machine and a series of inflated packaging cushions 10 fall into the container. When a suitable number of cushions has been formed, the operator stops the machine and, if necessary, tears the row of cushions at a perforation line 3 and conveys the filled container to a sealing station. The operation of the machine is controlled by a controller 115, which is of conventional design. Because the platform 112 is moveable, the machine 100 can be moved from one product line to another depending upon the need at a given time.

Figure 5:
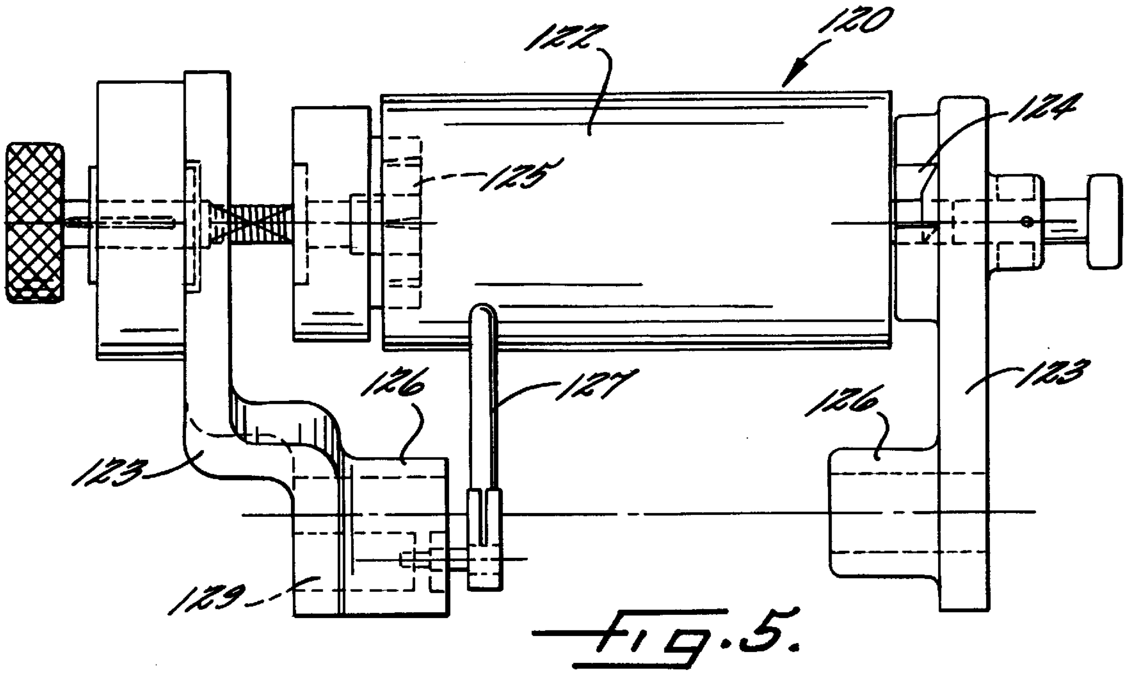
FIG. 5 is a top view of the film supply section of the present invention.

The film supply section 120 is attached to the top of telescoping column 111. The film supply section 120 includes a pair of arms 123 mounted at the top of the telescoping column 111 and spaced apart from each other a sufficient distance to accommodate a roll 122 of tubular thermoplastic material. As shown more clearly in FIG. 5, one arm has a channel 124 for accommodating one end of a roll of film. The other arm 123 has a seating member 121 for accommodating a retractable core plug 125. The seating member 121 forms a part of the inner end of brake hub 119 which in turn is attached to one end of hub spring 118. The seating member 121 maintains the roll of material 122 in a secured position and easily releases the core plug by retraction of plunger member 128 capped with hub retraction knob 128a which holds hub spring 118 in place around the outer portion of plunger member 128.

There is also provided a magnetic particle brake 129 which maintains constant web tension between the roll 122 of tubular thermoplastic material and drive roll 134 and nip roll 135. The follower arm 127 is connected through pivot 126 controlled by potentiometer 117 and connected through a feedback loop to controller 115 which changes the resistance of the brake depending upon the angle of the follower arm against the material roll 122. In other words, the brake 129 maintains constant tension on the roll no matter what the diameter. As shown, the brake 129 continues to apply tension to the roll as the size of the roll decreases through usage. When the roll 122 of thermoplastic material has been used up a new roll may be easily placed in position on arms 123.

The roll of material 122 may have a pair of core plugs 125 inserted in each end of the roll core. When the material roll 122 is placed in the channels 124, the core plugs 125 rest at the end or bottom of the channel. The arms are connected to roll width adjustment pivots 126 which are mounted to the column 111. The width between the arms 123 may be changed to accommodate different width rolls of material by moving pivots 126 to different fastening positions in the top of column 111. An example of one style of desirable core plug 125 is the spring tensioned plug and the plug seating arrangement shown in U.S. Pat. No. 5,322,234 and incorporated herein by reference.

The tubular thermoplastic material F is drawn from the film supply section 120 to the cushion forming section 130. The support base 131 of the cushion forming section 130 is mounted at the top of telescoping column 111 in film receiving proximity to the film supply section 120. The cushion forming section 130 includes means for delivering the tubular thermoplastic material F from the roll 122 through the cushion forming section 130. The preferred means is a first pair of rolls 134, 135 forming a nip therebetween through which the tubular material F passes. The drive roll is reversibly driven when actuated by motor 137*a* to provide the required tension of the tubular material during inflation of the cushion.

Pulley 137 is provided to accommodate belt 138 and is connected to motor 137*a* and to the controller 115. The drive belt 138 passes around a pulley attached to the end of drive roll 134, pulley 137 and idle-pulley 136. The film web F tension is not so tight as to prevent a predetermined amount of inflation of air into the area forming the cushion.

Figure 2:
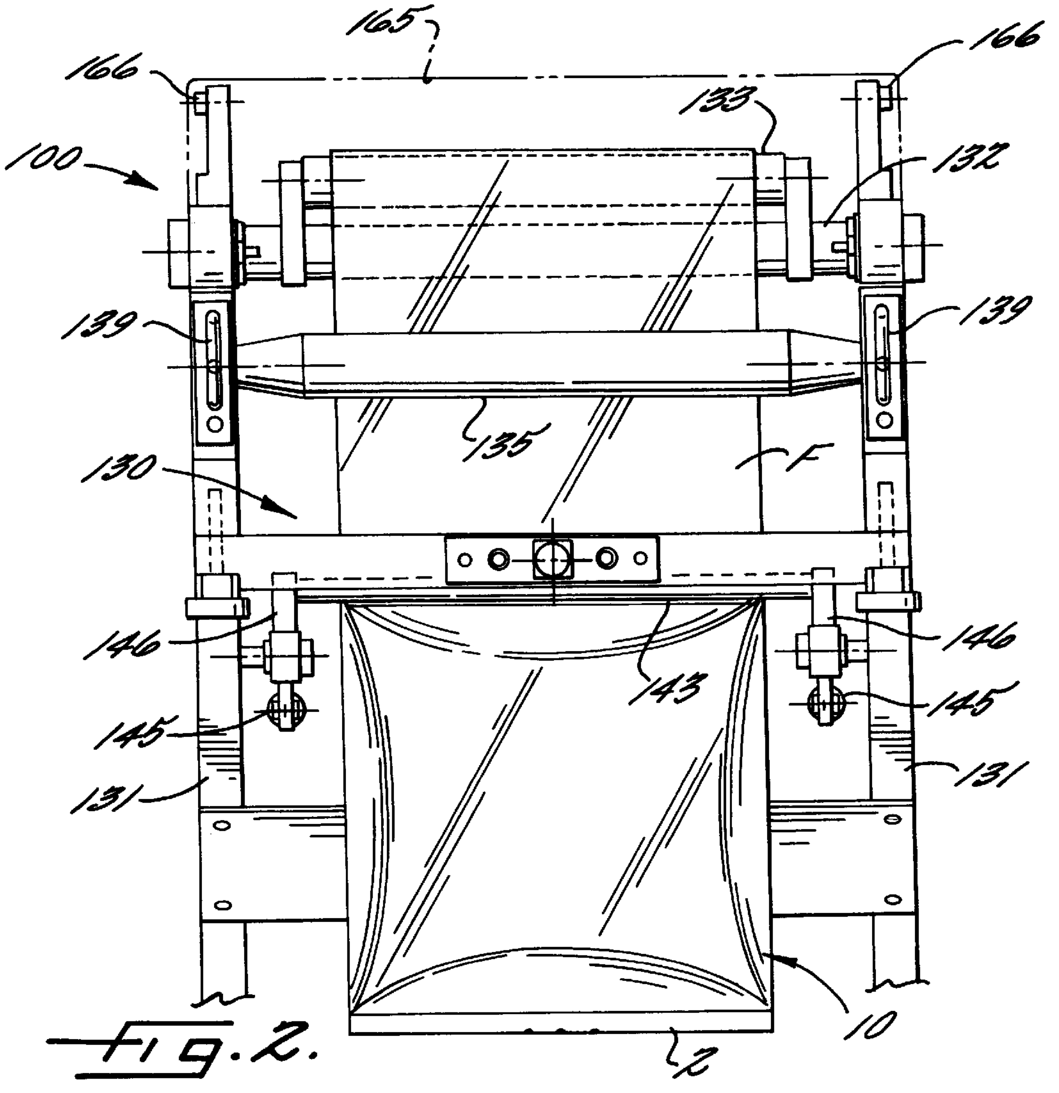
FIG. 2 is a front view of the cushion filling machine of the present invention.

As shown in FIGS. 2 and 4, set pin 139 is also provided to position or remove roll 135 and to adjust the tension on roll 135.

In order to provide a smooth delivery of the thermoplastic tubular material, the material F passes over an idler roll 132 and a dancer roll 133 positioned between the film roll 122 and the first pair of rolls 134, 135. There is a torsion spring 140 located above dancer roll 132 which serves to maintain the film against the dancer roll.

To form and inflate the cushion, it is necessary to separate the sides of the tubular material F from each other. There are several means for separating the sides of the tubular material from each other, such as by using vacuum cups. However, it has been found that when the tubular material is passed through a channel formed by walls 141, 142 that a bubble of residual air from the previous cycle is caught between the sides of the tubular material F forcing the sides against the channel walls 141, 142.

To maintain the tubular material under tension, a second pair of rolls, nip roll 143 and drive roll 144 positioned so as to form a nip through which tubular material F passes, is provided. The second pair of rolls is positioned to form a nip therebetween for drawing the web of thermoplastic film F. Rolls 143, 144 are capable of turning in one direction only so as to provide the desired tension. Once the cushion has been formed and sealed, the rolls 143, 144 are separated from each other so that the tubular material containing residual air may pass between the rolls and additional air fills the cushion below rolls 143, 144. Nip roll 143 is connected to a pneumatic cylinder 145 via link 146 for advancing and retracting the rolls toward and away from each other. To prevent the thermoplastic material from wrapping around drive roll 144, a jam plate 149 is provided. In addition, a jam belt (not shown) may be provided around one end drive roll 144.

Figure 6:
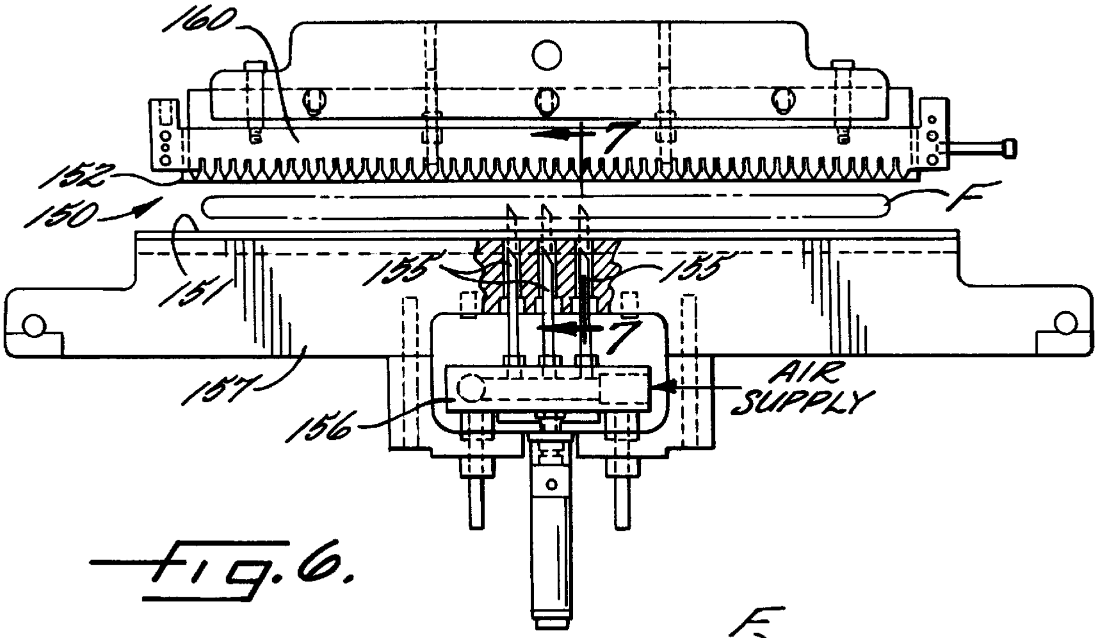
FIG. 6 is a top view of the filling needles, sealing portion and perforating portion of the cushion filling machine taken along line 6—6 of FIG. 4.
Figure 7:
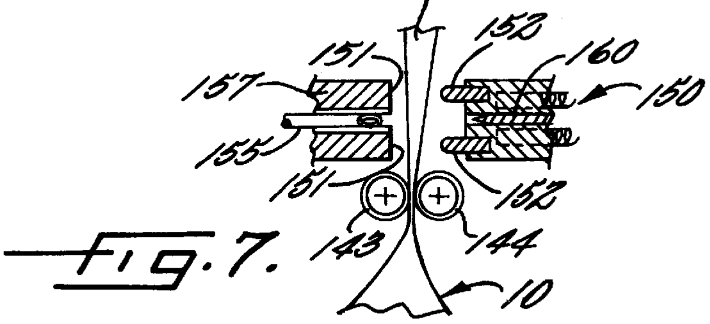
FIG. 7 is a fragment view taken along line 7—7 of FIG. 6.

Downstream from the channel walls 141, 142 and before the second pair of drive rolls 143, 144, are the sealing and filling elements. As shown more clearly in FIGS. 4 and 6–7, there is provided means for introducing air into the tubular thermoplastic material. In a preferred embodiment, a plurality of needles 155 attached through a manifold block 156 connected to an air supply are held in restraining bar 157 positioned adjacent the channel walls. See FIG. 6. While the tubular material F is under tension, pneumatic cylinder 158 moves the needles toward the tubular material piercing only one side thereof, as seen by dotted lines in FIG. 6, and inflating the cushion with the desired amount of air. As the needles 155 are removed, a sealing means 150 displaced transversely across the thermoplastic material for delimiting a volume serving to limit the size of the cushion 10 is moved toward the inflated cushion and presses the cushion against the restraining bars 157 to form seal 2. This seal effectively seals the holes made by the needles and leaves residual air in the tube to form the following cushion. More specifically, the sealing means 150 are provided with a pair of sealing bands or wires 152 which when in sealing position are disposed against the surface 151 of restraining bars 157 opposite each other. A pneumatic cylinder 154 is provided for advancing and retracting the seal jaws and the perforating knife 160 toward and away from the tubular material.

The perforation knife 160 is provided for forming perforation line 3 which can be used to separate each cushion for the next succeeding cushion. A cover 165 is hingably mounted to the top of the frame support 131.

In the basic operation of the sealing bar, a voltage is applied across a metal wire that heats to a desired temperature (or temperature range) when a reasonable voltage is applied. Such techniques can be rather crude, however, because simply applying voltage to a wire may heat it to a point where it not only seals the plastic, but also burns the plastic residue, crystallizes the polymer, and breaks the seal itself. Alternatively, if the wire fails to heat evenly or sufficiently, it may fail to provide a complete seal, leading to other problems, including leakage from the inflatable cushion.

The present invention also includes a method and apparatus for precisely measuring the characteristics, including, for example, the temperature of a cutting or sealing wire, and then controlling the wire to maintain it at a desired temperature or temperature range. Such method and apparatus is provided by the use of a measuring circuit and a storing circuit including a computer chip, such as an EEPROM, in conjunction with an individual heating element, i.e., a metal strip or wire.

In use, the sealing and band or wire calibrated to obtain measurements concerning the wire's individual characteristics, such as the resistance of the wire through the entire operational range. The computer chip is then programmed with the measured characteristics of the individual sealing wire, such as its precise temperature coefficient of resistance. Other information can also be programmed, including the history of the wire's use, as well as other characteristics of the cutting and sealing operation. The chip provides the system with the most recent information available concerning the wires used to carry out the cutting and sealing of the plastic for the inflatable cushion operation, so that the appropriate temperature or temperature range may be chosen for the operation of that wire.

Further, an alternative embodiment of this aspect of the invention records and calibrates the characteristics of motors and other components of the inflatable cushion forming machine. The use of smart components provides more precise control for the overall system which, as described above, is often a necessity for a quality final product.

A particular embodiment of the apparatus for precisely controlling the temperature of a cutting or sealing wire is shown by EEPROM 161 in FIG. 4 and includes an EEPROM, a conventional power supply, and conventional outputs. The EEPROM is programmed with information about the individual cutting and sealing wire, which then updates the temperature controlling operation to produce the proper temperature or temperature range. The device may also be adapted so that the circuit configuration provides feedback to the EEPROM with updated calibrations from the cutting and sealing wire to control the temperature of the wire. By controlling the temperature of the cutting and sealing wire, a complete and accurate seal and cut can be accomplished by the inflatable cushion forming machine.

Operation of the Machine

The inflatable cushion filling machine includes, as shown in FIG. 3, supplying a roll of tubular thermoplastic material F from a roll of film 122 which is placed on a delivery rack. At the tubular material delivery site, there is a brake 129 which maintains constant tension between the roll 122 of tubular thermoplastic material and rolls 134 and 135.

As the tubular material F leaves the supply roll 122, it passes over idler roll 132 and dancer roll 133 where it then passes through the nip formed between rolls 134 and 135. The tubular material then passes between channel wall 141, 142 which sizes the preformed bubble inflated by residual air from the previous cycle and past a second pair of rolls 143, 144. Roll 134 is reversed tensioning the tubular film F between the first pair of rolls and the second pair of rolls.

The needles 155 are moved toward the web to pierce one side of the web and air is injected. The second pair of rolls 143, 144 are moved apart allowing the air to pass to the area within the tubular material below rolls 143, 144, as shown in FIG. 4. The film is driven forward a fraction of an inch by drive roll 134 to relieve tension in the tubular material before sealing. At this point, the needles 155 are still forward (in the pre-bubble) and the nip between the second pair of rolls is open. This allows the tension to be relieved without moving the needle puncture holes out of the area between the seal wires 152. When that step is complete, the needles retract and the cushion is sealed above and below the needle puncture holes. The seal 2 forms the top seal of one inflated cushion and the bottom seal of the next consecutive cushion. During sealing, the perforation knife 160 extends between seal jaws 151 and 152 perforating the seal 2. Then the seal jaw 151 and 152 and the perforation knife retract and the cycle is repeated or stopped.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An inflatable cushion filling machine for forming inflated packaging cushions from a roll of tubular thermoplastic material comprising:

a film supply section comprising a means for holding said roll of tubular thermoplastic material; and a cushion forming section comprising;

a first means for delivering tubular thermoplastic material comprising a first pair of rolls forming a nip, one of said rolls being a drive roll, at least one of said rolls being capable of being reversibly driven and a second pair of rolls forming a nip positioned downstream and apart from said first pair of rolls;

means positioned between said first pair of rolls and second pair of rolls for introducing air into said tubular thermoplastic material as it is held under tension between said first pair of rolls and said second pair of rolls;

means displaced transversely across said tubular thermoplastic material for delimiting a volume serving to form a first inflated cushion, said means for delimiting a volume forming a top seal of said first inflated cushion and a bottom seal of a next cushion; and means for advancing and retracting said rolls of said second pair of rolls toward and away from each other so that said air may pass into said tubular material forming said first inflated cushion and residual air is left in that portion of said tubular material forming said next cushion.

2. The inflatable cushion filling machine according to claim 1 wherein said film supply section further comprises a brake which maintains constant web tension on said roll of tubular thermoplastic material.

3. The inflatable cushion filling machine according to claim 1 wherein said means for holding said roll of tubular material comprises a pair of arms, one of said arms having a spring loaded seating member for retaining and releasing a core plug.

4. The inflatable cushion filling machine according to claim 1 further comprising a dancer roll and an idler roll positioned between said holding means for said thermoplastic material and said first means.

5. The inflatable cushion filling machine according to claim 1 wherein said means for delimiting said volume serving to form said inflated cushion is a pair of sealing wires.

6. The inflatable cushion filling machine according to claim 1 wherein said means for introducing air into said cushion is a plurality of needles.

7. The inflatable cushion filling machine according to claim 1 further comprising a perforation knife for separating said inflated cushions.

8. The inflatable cushion filling machine according to claim 5 further comprising means for applying a voltage to said sealing wires and means for measuring and controlling the temperature of said wires.

9. An inflatable cushion filling machine for forming inflated packaging cushions from a roll of tubular thermoplastic material comprising:

a film supply section comprising a means for holding said roll of tubular thermoplastic material; and a cushion forming section comprising;

a first pair of rolls forming a nip, one of said rolls being a drive roll and capable of being reversibly driven and a second pair of rolls positioned downstream from said first pair of rolls, said pairs of rolls each forming a respective nip, being capable of providing tension on said tubular thermoplastic material and being for delivering said thermoplastic material through said cushion forming section;

means positioned between said pairs of rolls for forming, inflating, and separating said cushions, said means for forming, inflating, and separating said cushions comprising;

a plurality of needles for introducing air into said tubular thermoplastic material as it is held under tension between said first pair of rolls and said second pair of rolls;

a pair of seal bars capable of being displaced transversely across said thermoplastic material for delimiting a volume serving to form a first inflated cushion, said seal bars being for forming a top seal of said first inflated cushion and a bottom seal of a next cushion;

means for advancing and retracting said inflating needles, seal bars and a perforating knife toward and away from said tubular material; and means for advancing and retracting said rolls of said second pair of rolls toward and away from each other so that said air may pass into said tubular material forming said first inflated cushion and sufficient residual air is left in that portion of said tubular material forming said next cushion to maintain the sides of said tubular material apart.

10. The inflatable cushion filling machine according to claim 9 wherein said film supply section comprises a brake which maintains constant web tension on said roll of tubular thermoplastic material.

11. The inflatable cushion filling machine according to claim 9 further comprising a dancer roll and an idler roll positioned between said holding means for said thermoplastic material and said first pair of rolls.

* * * * *